United States Patent
Jiang et al.

(10) Patent No.: US 10,628,712 B2
(45) Date of Patent: Apr. 21, 2020

(54) METHOD AND APPARATUS FOR PROCESSING HIGH-PRECISION MAP DATA, STORAGE MEDIUM AND DEVICE

(71) Applicant: Baidu Online Network Technology (Beijing) Co., Ltd., Beijing (CN)

(72) Inventors: Zhaoyan Jiang, Beijing (CN); Shuwei Guan, Beijing (CN); Liang Song, Beijing (CN); Yang Yan, Beijing (CN)

(73) Assignee: Baidu Online Networking Technology (Beijing) Co., Ltd., Beijing (CN)

( * ) Notice: Subject to any disclaimer, the term of this patent is extended or adjusted under 35 U.S.C. 154(b) by 119 days.

(21) Appl. No.: 15/758,623

(22) PCT Filed: Dec. 25, 2015

(86) PCT No.: PCT/CN2015/099012
§ 371 (c)(1),
(2) Date: Mar. 8, 2018

(87) PCT Pub. No.: WO2017/041390
PCT Pub. Date: Mar. 16, 2017

(65) Prior Publication Data
US 2018/0253625 A1    Sep. 6, 2018

(30) Foreign Application Priority Data
Sep. 9, 2015 (CN) .......................... 2015 1 0571925

(51) Int. Cl.
*G06K 9/62* (2006.01)
*G06T 7/33* (2017.01)
(Continued)

(52) U.S. Cl.
CPC .............. *G06K 9/629* (2013.01); *G01C 21/32* (2013.01); *G06F 16/29* (2019.01); *G06K 9/0063* (2013.01);
(Continued)

(58) Field of Classification Search
CPC .......... G06K 9/46; G06F 16/29; G01C 21/32; G01C 21/30
(Continued)

(56) References Cited

U.S. PATENT DOCUMENTS

2007/0005609 A1\* 1/2007 Breed .................. B60N 2/2863
2010/0135531 A1 6/2010 Abe et al.
(Continued)

FOREIGN PATENT DOCUMENTS

CN 101673396 A 3/2010
CN 103996036 A 8/2014
(Continued)

OTHER PUBLICATIONS

Yu, Y. et al.; "Automated Extraction of Urban Road Facilities Using Mobile Laser Scanning Data"; IEEE Transactions on Intelligent Transportation Systems, vol. 16, No. 4; Aug. 2015; pp. 2167-2181; XP11664664A (15 pages).
(Continued)

*Primary Examiner* — Dwayne D Bost
*Assistant Examiner* — Stephen M Brinich
(74) *Attorney, Agent, or Firm* — Nixon Peabody LLP

(57) ABSTRACT

A method and an apparatus for processing high-precision map data, a storage medium and a device. The method includes: performing at least twice collection on map data along a target trajectory so as to respectively acquire at least twice original map data; recognizing an object in the original map data respectively, and extracting an object feature; matching the object feature in each of the original map data; considering an object with the matched object feature as a reference object; and performing fusion processing on each of the original map data. An object in original map data is recognized and an object feature is extracted, then the object feature in each of the original map data is matched and the
(Continued)

object obtained after the matching is considered as a reference object, and the reference object is utilized to perform fusion processing on the original map data. In this way, a problem of offset of an object in a map image is solved, ghosting of the map image is removed, and a definition of the map image is improved.

14 Claims, 2 Drawing Sheets

(51) Int. Cl.
*G01C 21/32* (2006.01)
*G06K 9/46* (2006.01)
*G06F 16/29* (2019.01)
*G06T 7/38* (2017.01)
*G06K 9/00* (2006.01)

(52) U.S. Cl.
CPC ............ *G06K 9/46* (2013.01); *G06K 9/6201* (2013.01); *G06T 7/33* (2017.01); *G06T 7/38* (2017.01); *G06K 2009/6213* (2013.01); *G06T 2207/10028* (2013.01); *G06T 2207/10032* (2013.01); *G06T 2207/20221* (2013.01)

(58) Field of Classification Search
USPC ................. 382/100, 103–104, 113, 106–107
See application file for complete search history.

(56) References Cited

U.S. PATENT DOCUMENTS

| | | |
|---|---|---|
| 2010/0290692 A1 | 11/2010 | Macaulay et al. |
| 2016/0357262 A1* | 12/2016 | Ansari .................... G06F 3/017 |
| 2018/0018805 A1* | 1/2018 | Kutliroff ................ G06T 17/00 |

FOREIGN PATENT DOCUMENTS

| | | |
|---|---|---|
| CN | 104766058 A | 7/2015 |
| JP | 2007-232381 A | 9/2007 |
| JP | 2008-065087 A | 3/2008 |
| JP | 2008-262307 A | 10/2008 |
| JP | 2008-276642 A | 11/2008 |
| KR | 10-1999-0086247 A | 12/1999 |

OTHER PUBLICATIONS

Chen, X. et al.; "Next Generation Map Making: Geo-Referenced Ground-Level LIDAR Point Clouds for Automatic Retro-Reflective Road Feature Extraction"; ACM GIS '09, pp. 488-491; Nov. 4-6, 2009, Seattle, Washington; XP58360590A (4 pages).

Yu, F. et al.; "Semantic Alignment of LiDAR Data at City Scale"; Computer Vision and Pattern Recognition (CVPR), Jun. 2015 IEEE, pp. 1722-1731; XP32793629A (10 pages).

International Search Report corresponding to co-pending International Patent Application No. PCT/CN2015/099012, State Intellectual Property Office of the P.R. China, dated Jun. 12, 2016; (2 pages).

Geospatial Information, vol. 12, No. 4; Aug. 2014; doi:10.11709/j.issn.1672-4623.2014.04.052; English translation not available (6 pages).

Zou Xiao et al.; "Automatic Road Marking Detection and Extraction Based on LIDAR Point Clouds from Vehicle-Borne MMS"; Geomatics & Spatial Information Technology, vol. 35, No. 9; Sep. 2012; with English abstract (4 pages).

Zhu Rui; "A Method of he Consistency Processing in Geometric Position for Road Features Updating"; Journal of Geomatics Science and Technology, vol. 31, No. 2, pp. 190-193; 2014 with English abstract (6 pages).

* cited by examiner

METHOD AND APPARATUS FOR PROCESSING HIGH-PRECISION MAP DATA, STORAGE MEDIUM AND DEVICE

CROSS-REFERENCE TO RELATED APPLICATION

This patent application is a U.S. National Stage of International Application No. PCT/CN2015/099012, filed Dec. 25, 2015, which is related to and claims the priority to the Chinese Patent Application No. 201510571925.6 entitled "Method and Apparatus for Processing High-Precision Map Data" filed by Baidu Online Network Technology (Beijing) Co., Ltd on Sep. 9, 2015, both of the entire content of which are incorporated herein by reference in their entireties.

TECHNICAL FIELD

Embodiments of the present disclosure relate to map data processing technologies, and more particularly, to a method and apparatus for processing high-precision map data, a storage medium and a device.

BACKGROUND

More and more users now drive a car to visit relatives, explore and travel. When the users go to destinations they are not familiar with, they will rely on using smart terminals to make a map query. The users may view and choose travel routes by entering the destinations into the smart terminals. Therefore, to a large extent, the use of the maps provides convenience in one's life.

At present, before map images are formed, the collection of map image data is normally completed using a plurality of tools, such as an inertial measurement unit (IMU), a global positioning system (GPS) or a light detection and ranging (LIDAR), then the data is fused to form the map data.

The IMU mainly includes two parts, namely a gyroscope and an accelerometer, both of which may have a direct impact on the accuracy of the image data measured by the IMU. The gyroscope is mainly used for measuring angular velocity information of a moving object, the accelerometer is mainly used for measuring acceleration information of the moving object, and the IMU may obtain motion morphology of the moving object based on calculation of the information measured.

The GPS mainly includes three parts, namely a space constellation, a ground monitor and a user device, all of which may have a direct impact on the accuracy of the image data obtained by the GPS. Generally consisting of twenty-four satellites, the space constellation is used for measuring the image data of a ground object in real time. The ground monitor is used for receiving the map data of the object which are sent by a satellite of the space constellation and obtained by the satellite through measurement. The user device is used for performing calculation on the map data of the object to obtain location information of the object.

The LIDAR mainly uses the IMU and the GPS for laser scanning. Data measured by the LIDAR are point cloud data, that is, the measured data are a series of discrete points of an object surface model. The point cloud data include spatial three-dimensional information and laser intensity information of the object. A sensor in the LIDAR transmits laser beams to the ground or the object surface, the laser beams may reflect when encountering a barrier. Reflected energy of the laser beams is recorded by the sensor and taken as the laser intensity information, and the reflectivity of the laser beams may be obtained based on calculation using the laser intensity information.

Generally, to ensure the diversity and comprehensiveness of the map data obtained by measuring, collection tracks of the obtained map data may be repeatedly collected using the above tools. After the collection of the map data, a high-accuracy map may be finally obtained by associating the corresponding map data obtained by multiple collections using the GPS or the IMU.

However, the existing technologies have the following defects: when associating the corresponding map data obtained by multiple collections using the GPS or the IMU, misalignment of the objects may occur in the map image obtained after the association due to the limitations in measurement accuracy of the tools per se, and calculation accuracy, which leads to ghosting of the object in the map image in the user's eyes, thereby seriously affecting the use experience.

SUMMARY

Embodiments of the present disclosure mainly aim at providing a method and an apparatus for processing high-precision map data, a storage medium and a device, so as to solve the problems of offset of an object and ghosting in a map image occurred when associating the image data collected by many times.

The embodiments of the present disclosure adopt following technical solutions.

In a first aspect, the embodiments of the present disclosure provide a method for processing high-precision map data, which comprises:

performing at least twice collection on map data along a target trajectory so as to respectively acquire at least twice original map data;

recognizing an object in the original map data respectively and extracting an object feature;

matching the object feature in each of the original map data; and considering an object with the matched object feature as a reference object and performing fusion processing on each of the original map data.

In a second aspect, the embodiments of the present disclosure further provide an apparatus for processing high-precision map data, which comprises:

a collecting module, configured to perform at least twice collection on map data along a target trajectory so as to respectively acquire at least twice original map data;

a recognizing module, configured to recognize an object in the original map data respectively and extract an object feature;

a matching module, configured to match the object feature in each of the original map data; and a fusion processing module, configured to consider an object with the matched object feature as a reference object and perform fusion processing on each of the original map data.

In a third aspect, the embodiments of the present disclosure provide a non-volatile computer storage medium. The computer storage medium stores one or more modules. When the one or more modules are performed by a device for executing the method for processing high-precision map data, the device is caused to:

perform at least twice collection on map data along a target trajectory so as to respectively acquire at least twice original map data;

recognize an object in the original map data respectively and extract an object feature;

match the object feature in each of the original map data; and consider an object with the matched object feature as a reference object and perform fusion processing on each of the original map data. In a fourth aspect, the embodiments of the present disclosure provide a device, which comprises:

one or more processors;

a memory; and one or more programs, the one or more programs being stored in the memory, and when being executed by the one or more processors, the one or more programs being caused to:

perform at least twice collection on map data along a target trajectory so as to respectively acquire at least twice original map data;

recognize an object in the original map data respectively and extract an object feature;

match the object feature in each of the original map data; and consider an object with the matched object feature as a reference object and perform fusion processing on each of the original map data.

According to the method and apparatus for processing high-precision map data, the storage medium and the device provided by the embodiments of the present disclosure, an object in original map data is recognized and an object feature is extracted, then the object feature in each of the original map data is matched and the object obtained after the matching is considered as a reference object, and the reference object is utilized to perform fusion processing on the original map data. In this way, the problem of offset of an object in a map image is solved, ghosting of the map image is removed, and the definition of the map image is improved.

BRIEF DESCRIPTION OF THE DRAWINGS

Hereinafter, drawings used to describe the embodiments will be briefly introduced so as to explain the technical solutions in the embodiments of the present disclosure more clearly. Of course, the drawings described below are only some of the embodiments of the present disclosure; to those skilled in the art, these drawings may be subjected to modification and substitution without exercise of creative work.

DETAILED DESCRIPTION OF EMBODIMENTS

Technical solutions in the embodiments of the present disclosure will be described clearly and completely below, in conjunction with the accompanying drawings. Apparently, the described embodiments are some but not all of the embodiments of the present disclosure, for the purpose of expounding the principles of the present disclosure instead of limiting the present disclosure to these specific embodiments. All other embodiments obtained by those of ordinary skills in the art based on the embodiments of the present disclosure without creative efforts shall fall within the protection scope of the present disclosure.

Embodiment I

Figure 1:
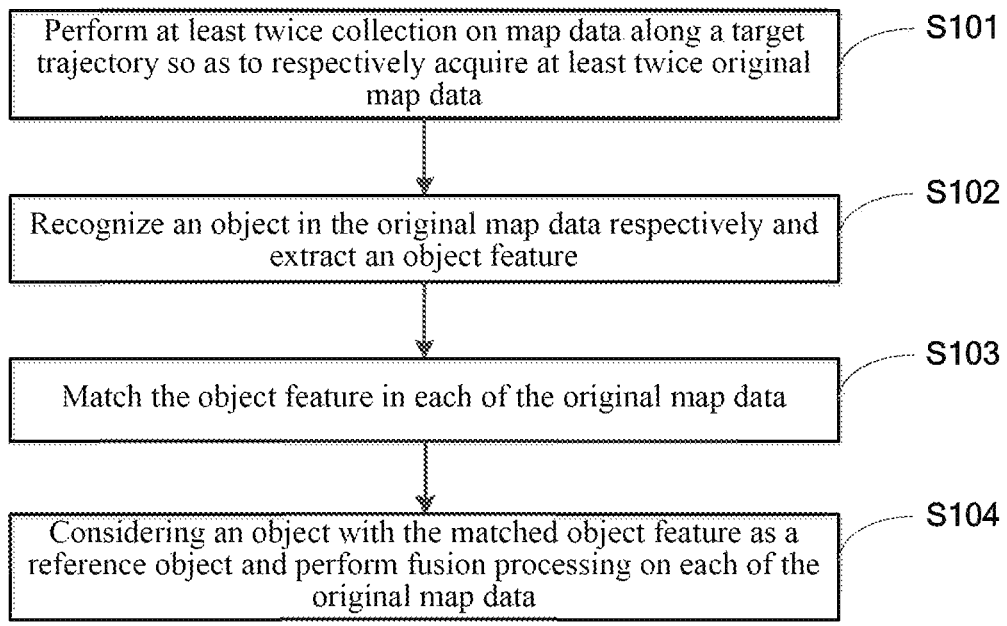
FIG. 1 is a flowchart of a method for processing high-precision map data according to Embodiment I of the present disclosure.

FIG. 1 is a flowchart of a method for processing high-precision map data according to Embodiment I of the present disclosure. The method may be performed by an apparatus for processing high-precision map data, wherein the apparatus may be implemented by software and/or hardware, and generally may be integrated into a server having image data processing capacity.

Referring to FIG. 1, the method specifically comprises following steps.

S101: performing at least twice collection on map data along a target trajectory so as to respectively acquire at least twice original map data.

In the operation, the target trajectory may refer to a collection route of a collection tool such as a collection vehicle, a collection model airplane or a collection robot, which carries out map data collection. The route may be artificially set and stored in the collection tool in advance and may also be the better collection route automatically determined by the collection tool according to a collection initiation point and a termination point artificially inputted.

Generally, when the collection tool collects the map data of objects around the target trajectory, complete collection of the map data of all the objects cannot be ensured to be finished once. In general, to ensure the diversity and the comprehensiveness of the collected map data of the objects around the target trajectory, the collection tool may perform at least twice collection on the map data of the objects around the same collection track. Advantages of such arrangement are as below: by performing fusion processing on the map data of the same object obtained through multiple collections, information of the object may be presented in a map as much as possible, and thus the use experience of the user may be improved.

Herein, it is to be further noted that the collection tool at least comprises one of the IMU, the GPS or the LIDAR. The collection tool collects the map data of the peripheral objects along the target trajectory to obtain point cloud data and the image data of the corresponding objects.

S102: recognizing an object in the original map data respectively and extracting an object feature.

In the above operation, after the map data collection is finished, the map data may be processed by utilizing the collection tool. First, dynamic objects or static objects in original map data collected at each time are recognized using the collection tool. For example, according to the collected original map data, the IMU may calculate the motion morphology of each dynamic object, and the LIDAR may calculate the morphological features or structural features of each static object. After the objects in the original map data are recognized, the features of different objects may be extracted. Preferably, as for a dynamic object, the features such as the moving speed and/or accelerated speed in unit time may be extracted. As for a static object, the structural features, the gravity centre features and/or the morphological features may be extracted. Preferably, the object features of the static objects are collected to serve as reference features.

Herein, it is to be noted that when the objects in the original map data collected at each time are recognized, iconic objects may be selectively recognized, or all the objects may be recognized. In this embodiment, preferably, the iconic objects in the original map data collected at each time are recognized. For example, the iconic objects, such as road planes, vehicles, lamp posts, a road sign or building planes on the road plane, in the original map data are recognized. Advantages of such arrangement are as below: on one hand, the accuracy of recognition is improved by recognizing the iconic objects, and on the other hand, the time required for recognition is shortened and the recognition cost is lowered by merely recognizing the iconic objects.

S103: matching the object feature in each of the original map data.

In the above operation, the objects in the original map data collected at each time are recognized using the collection tool, and the features of the recognized objects in the original map data collected at each time are extracted. After the extraction, the same object feature in each of the original map data is matched. Advantages of such arrangement are as below: the ghosting generated during fusion processing of the object features obtained at each time by recognizing the original map data can be eliminated by matching, so that the objects subjected to object feature matching are guaranteed to keep consistent with the actual objects, and the map accuracy may be guaranteed.

Preferably, after the object features in the original map data obtained at each time are matched, mismatching operation in the matching process may further be removed by adopting a random sample consensus (RANSAC) algorithm to ensure that the consistency between the objects subjected to object feature matching and the actual objects is higher, and the map accuracy effectively is more effectively guaranteed.

S104: considering an object with the matched object feature as a reference object and performing fusion processing on each of the original map data.

In the above operation, the objects with the matched object features may be used as reference objects, and fusion processing is performed on the original map data obtained at each time that represent different objects using a relative position relationship among the reference objects, so that a high-accuracy map with the object ghosting and deviation removed is obtained finally.

According to the technical solutions provided by this embodiment, an object in original map data is recognized and an object feature is extracted, then the object feature in each of the original map data is matched and the object obtained after the matching is considered as a reference object, and a relative position relationship of the reference object is utilized to perform fusion processing on each of the original map data. In this way, the problem of offset of an object when performing fusion processing on each of the original map data is solved, thus ghosting of the map image is removed, and the definition of the map image is improved.

On the basis of the above technical solution, preferably, before the recognizing an object in the original map data respectively and extracting an object feature, the method further comprises: respectively analyzing and partitioning the original map data according to a collection track; and associating partitioned original map data segments to serve as associated original map data for subsequently recognizing the object.

First, the original map data obtained in each collection are analyzed, wherein analyzed contents may comprise the length of the collection track, a gray value of the original map data obtained by collection or a feature value of each iconic object; and then the original map data collected at each time may be partitioned averagely according to the length of the collection track, or may be partitioned into a plurality of sections according to a certain rule, or may be partitioned into a plurality of sections according to a variation of the gray value of the original map data or may be partitioned into a plurality of sections according to the feature values of the iconic objects. Herein, principles of the partitioning are not limited, and the partitioning may be carried out according to the artificially preset partitioning principle or the default partitioning principle of the collection tool. In addition, the number of the partitioned sections is not limited.

The corresponding sections of the partitioned original map data collected at each time are associated, and the offset rotation angle and the offset of the associated sections of the original map data collected at each time are analyzed to facilitate the subsequent operations.

When the collection track is longer, in the process of performing map data collection on the objects around the collection track by the collection tool, the offset rotation angle and the offset collected on the collection track of different sections may be different. If the whole collection track is directly processed, an offset rectification rotation angle and an offset rectification quantity are difficult to be set uniformly when fusion processing is performed on the original map data collected at each time. If the offset rectification rotation angle and the offset rectification quantity are set to be fixed values, only deviations, equivalent or approximate to the offset rotation angle and the offset, of the map data in the sections of the original map data can be eliminated, to solve the problem of ghosting of the map image. However, other deviations, greatly differing from the offset rotation angle and the offset, of the map data in the sections of the original map data still exist, and thus the problem of ghosting of the map image still exists.

Therefore, advantages of analyzing and partitioning the collection track are as below: after subsequently recognizing the associated original map data of the object and extracting the object feature, fusion processing is performed on the original map data collected at each time according to the offset rotation angle and the offset of each section of the original map data collected at each time. In this way, the problem of offset of an object during fusion processing may be better solved, and ghosting in a map image may be eliminated.

Further, on the basis of the above technical solution, the considering an object with the matched object feature as a reference object and performing fusion processing on each of the original map data may be optimized as below: considering the object with the matched object feature as the reference object and calculating an offset rotation angle and an offset for each of the original map data; and performing fusion processing on the original map data based on the offset rotation angle and the offset of each of the original map data.

After respectively analyzing and partitioning the original map data collected at each time according to a collection track and associating partitioned original map data segments, the offset rotation angle and the offset of the original map data are calculated, wherein the offset rotation angle and the offset of the object with the matched object feature may be calculated, and the offset rotation angle and the offset of the object may serve as the offset rotation angle and the offset of the original map data segments.

Fusion processing is performed on each of the original map data segments according to the offset rotation angle and the offset of each of the original map data segments and the determined reference object.

Preferably, the offset rotation angle and the offset of each of the original map data may be calculated using an iterative closest point (ICP) algorithm.

Embodiment II

On the basis of the above embodiment, according to the method for processing high-precision map data provided by Embodiment II of the present disclosure, further, the recognizing an object in the original map data respectively and extracting an object feature may be optimized as below: performing static object recognition using point cloud data in the original map data and extracting a structural feature of the static object.

The point cloud data comprise reflectivities and morphological features of different objects. The point cloud data are a series of discrete points of an object data surface model. Therefore, compared with recognizing an object using the image data, recognizing a static object using the point cloud data may enhance the accuracy in object recognition, and further enhance the accuracy of extracting the object feature.

Optionally, on the basis of the technical solution of the above embodiments, a lane line is recognized using a reflectivity of the point cloud data in the original map data, a road plane is determined by fitting the lane line, and a planar feature of the road plane is extracted.

The collection tool recognizes the lane line using the reflectivity of the point cloud data in the original map data. The lane line is manufactured by adopting a special reflectorized paint, which allows the reflectivity of the lane line to be higher than that of other objects. Therefore, the collection tool recognizes the lane line from the original map data collected at each time by utilizing the high reflectivity. Further, after the lane line is recognized, the road plane is determined by fitting the width and the length of the lane line, and the planar features of the road plane are extracted, wherein the planar features may comprise features such as the width or the length of the lane line.

Further, minimum bounding box recognition is performed on an object beyond the road plane according to the point cloud data, a vehicle and a lamp post are respectively recognized according to a feature of the minimum bounding box, the planar feature of a vehicle top of the motionless vehicle is extracted, and a gravity centre feature of the lamp post is extracted.

The road plane may be determined in many ways, and then the lamppost is recognized based on the road plane. The bounding box may refer to an imaginary hexahedral structure that can contain an object, and the minimum bounding box may refer to an imaginary hexahedral structure that can exactly contain an object. According to morphological features of objects, different objects may have different minimum bounding boxes.

Figure 2:
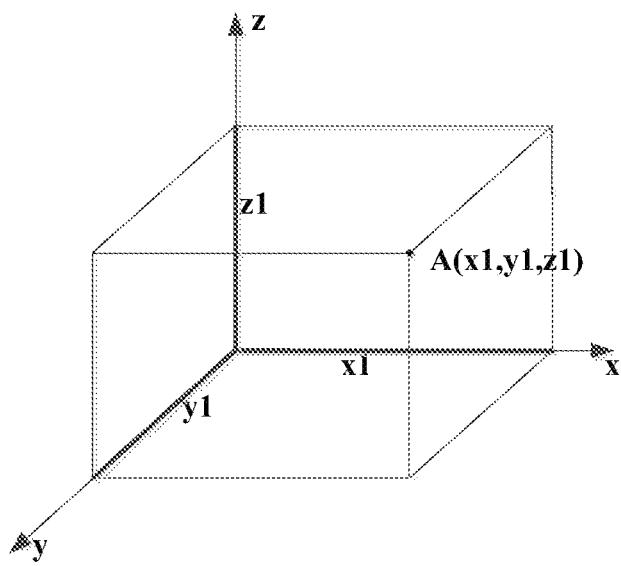
FIG. 2 is a schematic diagram of a three-dimensional coordinate system of a minimum bounding box according to Embodiment II of the present disclosure.

FIG. 2 is a schematic diagram of a minimum bounding box according to Embodiment II of the present disclosure. As shown in FIG. 2, the feature of the minimum bounding box may refer to a three-dimensional coordinate A (x1, y1, z1) of a preset vertex A of the minimum bounding box, wherein the x1 represents the length of the minimum bounding box, the y11 represents the width of the minimum bounding box, and the z1 represents the height of the minimum bounding box, or may refer to an average value of distances from a center point O of the minimum bounding box to each vertex. Exemplarily, the minimum bounding box feature may serve as the three-dimensional coordinate A (x1, y1, z1) of the preset vertex A, the minimum bounding box feature of the vehicle may be x1>z1, and y1>z1, and the minimum bounding box feature of the lamp post may be z1>>x1, and z1>>y1.

The minimum bounding box of an object beyond the road plane is recognized according to the point cloud data in the original map data collected by the collection tool. The iconic objects (the vehicle and the lamp post) are respectively recognized according to the features of the minimum bounding boxes of different objects, the planar feature of the vehicle top for recognizing the vehicle is extracted, and a gravity centre feature for recognizing the lamp post is extracted.

Further, the point cloud data having reflectivity reaching a high reflectivity condition may be clustered based on the reflectivity of the point cloud data in the original map data, plane fitting is performed on the clustered point cloud data, a road sign is recognized from the fitted plane and a planar feature of the road sign is extracted.

The map data of the objects are collected by utilizing the LIDAR to obtain the point cloud data of the objects, wherein the point cloud data contain the reflectivities of different objects. Among the objects around the collection track, a part of the objects are lower in reflectivity, for example grasses, trees, vehicles or buildings, and the other part of the objects are higher in reflectivity, for example the lane line, glass or the road sign. The collection tool analyzes and calculates the reflectivities of different objects in the point cloud data. When the reflectivity of an object is beyond a preset threshold range, the point cloud data of the object is determined to be the point cloud data with a high reflection condition, wherein the preset threshold range may be artificially preset according to the corresponding collection track, or may be set by default by the collection tool.

The point cloud data are classified according to high and low reflectivities, the point cloud data of the same object having reflectivity reaching a high reflectivity condition are clustered, plane fitting is performed on the clustered point cloud data, a road sign is recognized from the fitted plane and a planar feature of the road sign is extracted. Generally, the road sign is positioned on either side of the road plane or a crossroad. Hence, the planar feature of the road sign is extracted, the road sign planar feature in the original map data collected at each time is matched in the subsequent operations, and the road sign with the matched road sign planar feature is taken as a reference object. Fusion processing is performed on the original map data collected at each time by utilizing the relative position relationship of the road sign. In this way, the accuracy of fusion processing may be further enhanced, the problem of ghosting of a map image is better solved, and the definition of the map image is improved.

Herein, it is to be noted that the process of recognizing the iconic objects according to the reflectivity in the point cloud data may be adopted separately or be adopted conjunctively.

According to the technical solution of this embodiment, a static object is recognized according to the point cloud data, and the structural feature of the static object is extracted. Further, map data of an iconic object such as a motionless vehicle, a lamp post and/or a road sign are recognized from the road plane, so that in the subsequent operation, the iconic object features in the original map data collected at each time are matched, and the iconic object with the matched object feature is taken as a reference object. Fusion processing is performed on the original map data collected at each time by utilizing the relative position relationship of the iconic object. In this way, the accuracy of fusion processing may be further enhanced, the problem of ghosting of a map image may be better solved, and the definition of the map image may be improved.

Embodiment III

Figure 3:
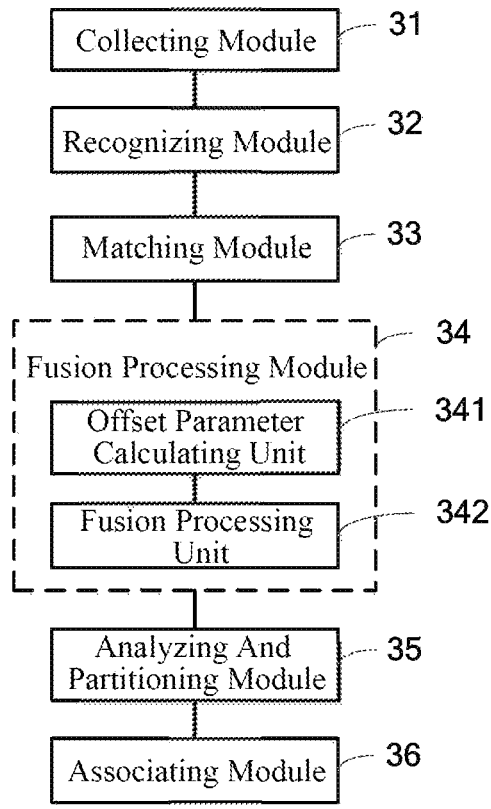
FIG. 3 is a schematic structural diagram of an apparatus for processing high-precision map data according to Embodiment III of the present disclosure.

FIG. 3 is a schematic structural diagram of an apparatus for processing high-precision map data according to Embodiment III of the present disclosure.

Referring to FIG. 3, the apparatus of this embodiment specifically comprises: a collecting module 31, a recognizing module 32, a matching module 33 and a fusion processing module 34.

The collecting module 31 is configured to perform at least twice collection on map data along a target trajectory so as to respectively acquire at least twice original map data.

The recognizing module 32 is configured to recognize an object in the original map data respectively and extract an object feature.

The matching module 33 is configured to match the object feature in each of the original map data.

The fusion processing module 34 is configured to consider an object with the matched object feature as a reference object and perform fusion processing on each of the original map data.

According to the technical solution of this embodiment, at least twice collection may be performed on the map data by the collecting module 31 along the target trajectory to respectively acquire at least twice original map data, objects in the original map data acquired by at least twice collection are recognized by the recognizing module 32 to extract object features, then the extracted object features in the original map data collected at each time are matched by the matching module 33, after the matching, objects with the matched object features are considered as reference objects by the fusion processing module 34, and fusion processing is performed on the original map data using a relative position relationship among the reference objects. In this way, the problem of offset of an object when performing fusion processing on the original map data is solved, thus ghosting of a map image is removed, and the definition of the map image is improved.

Further, the recognizing module 32 in the apparatus specifically is configured to perform recognition on a static object using point cloud data in the original map data and extract a structural feature of the static object.

Further, the recognizing module 32 specifically is configured to recognize a lane line based on a reflectivity of the point cloud data in the original map data, fit a road plane by means of the lane line, and extract a planar feature of the road plane.

Further, the recognizing module 32 specifically is configured to perform minimum bounding box recognition on an object beyond a road plane based on the point cloud data, recognize a vehicle and a lamp post according to a feature of the minimum bounding box respectively, extract a planar feature of a vehicle top of the motionless vehicle, and extract a gravity centre feature of the lamp post.

Further, the recognizing module 32 specifically is configured to cluster point cloud data having reflectivity reaching a high reflectivity condition based on the reflectivity of the point cloud data in the original map data, perform plane fitting on the clustered point cloud data, recognize a road sign from the fitted plane and extract a planar feature of the road sign.

Based on the above technical solutions, the apparatus further comprises:

an analyzing and partitioning module 35, configured to respectively analyze and partition the original map data according to a collection track before recognizing an object in the original map data respectively and extracting an object feature; and an associating module 36, configured to associate partitioned original map data segments to serve as associated original map data for subsequently recognizing the object.

Further, the fusion processing module 34 comprises:

an offset parameter calculating unit 341, configured to consider the object with the matched object feature as the reference object and calculate an offset rotation angle and an offset for each of the original map data; and a fusion processing unit 342, configured to perform fusion processing on the original map data according to the offset rotation angle and the offset of each of the original map data.

The above apparatus for processing map data may execute the method for processing high-precision map data provided by any embodiment of the present disclosure, and has corresponding functional modules for executing the method and beneficial effects.

Embodiment IV

This embodiment provides a non-volatile computer storage medium storing one or more modules, the one or more modules when executed by a device for executing a method for processing high-precision map data, causing the device to execute the following operations:

performing at least twice collection on map data along a target trajectory so as to respectively acquire at least twice original map data;

recognizing an object in the original map data respectively and extracting an object feature;

matching the object feature in each of the original map data;

considering an object with the matched object feature as a reference object, and performing fusion processing on each of the original map data.

When the one or more modules stored in the abovementioned storage medium are executed by the device, the processing of recognizing an object in the original map data respectively and extracting an object feature may preferably comprise:

performing recognition on a static object using point cloud data in the original map data and extracting a structural feature of the static object.

When the one or more modules stored in the abovementioned storage medium are executed by the device, the processing of performing recognition on a static object using point cloud data in the original map data and extracting a structural feature of the static object may preferably comprises:

recognizing a lane line based on a reflectivity of the point cloud data in the original map data, fitting a road plane by means of the lane line and extracting a planar feature of the road plane.

When the one or more modules stored in the abovementioned storage medium are executed by the device, the processing of performing recognition on a static object using point cloud data in the original map data and extracting a structural feature of the static object may preferably comprises:

performing minimum bounding box recognition on an object beyond a road plane based on the point cloud data, recognizing respectively a vehicle and a lamp post according to a feature of the minimum bounding box, extracting a planar feature of a vehicle top of the motionless vehicle, and extracting a gravity centre feature of the lamp post.

When the one or more modules stored in the above-mentioned storage medium are executed by the device, the processing of performing recognition on a static object using point cloud data in the original map data and extracting a structural feature of the static object may preferably comprises:

clustering point cloud data having reflectivity reaching a high reflectivity condition based on the reflectivity of the point cloud data in the original map data, performing plane fitting on the clustered point cloud data, recognizing a road sign from the fitted plane and extracting a planar feature of the road sign.

When the one or more modules stored in the above-mentioned storage medium are executed by the device, before recognizing respectively an object in the original map data and extracting an object feature, the operations may further comprise:

respectively analyzing and partitioning the original map data according to a collection track; and associating partitioned original map data segments to serve as associated original map data for subsequently recognizing the object.

When the one or more modules stored in the above-mentioned storage medium are executed by the device, the processing of considering an object with the matched object feature as a reference object and performing fusion processing on each of the original map data may preferably comprises:

considering the object with the matched object feature as the reference object and calculating an offset rotation angle and an offset for each of the original map data; and performing fusion processing on the original map data based on the offset rotation angle and the offset of each of the original map data.

Embodiment V

Figure 4:
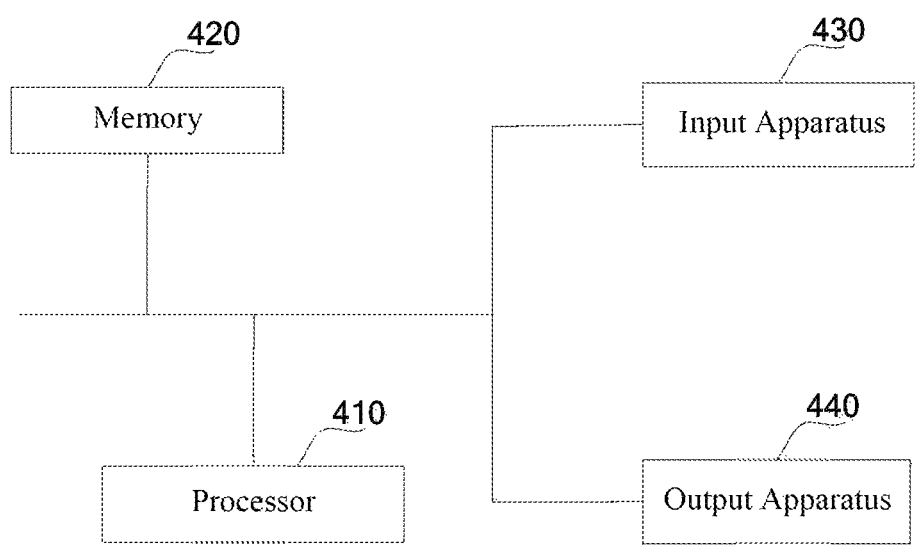
FIG. 4 is a schematic diagram of a hardware structure of a device for executing a method for processing high-precision map data according to Embodiment V of the present disclosure.

FIG. 4 is a schematic diagram of a device hardware structure for executing a method for processing high-precision map data according to Embodiment V of the present disclosure.

Referring to FIG. 4, the device comprises:

one or more processors 410, wherein one processor 410 is taken as an example in FIG. 4;

a memory 420; and one or more modules.

The device may further comprise: an input apparatus 430 and an output apparatus 440. The processor 410, the memory 420, the input apparatus 430, and the output apparatus 440 in the device may be connected via a bus or in other modes. Connection by a bus is used as an example in FIG. 4.

As a computer readable storage medium, the memory 420 may be used to store software programs, computer executable programs, and modules, for example, the program instructions/modules corresponding to the method for processing high-precision map data in the embodiments of the present disclosure (for example, the collecting module 31, the recognizing module 32, the matching module 33, and the fusion processing module 34 shown in FIG. 3). The processor 410 runs the software programs, instructions and modules stored in the memory 420 to execute various functional applications and data processing of a server, that is, to implement the method for processing high-precision map data of the above method embodiments.

The memory 420 may include a program storage area and a data storage area. The program storage area may store an operating system and an application required for at least one function. The data storage area may store data and the like created according to the usage of a terminal device. In addition, the memory 420 may include a high-speed random access memory, and may also include a non-volatile memory, e.g., at least one disk storage device, a flash memory device or other non-volatile solid-state storage devices. In some embodiments, the memory 420 may further include memories remotely arranged relative to the processor 410, where the remote memories may be connected to the terminal device by a network. An example of the above network includes but not limited to, the Internet, an enterprise intranet, a local area network, a mobile communications network, and a combination thereof.

The input apparatus 430 may be used for receiving entered digit or character information, and generating a key signal input related to the user setting and function control of the terminal device. The output apparatus 440 may include a display screen and other display devices.

The one or more modules stored in the memory 420, when executed by the one or more processors 410, perform the following operations:

performing at least twice collection on map data along a target trajectory so as to respectively acquire at least twice original map data;

recognizing an object in the original map data respectively and extracting an object feature;

matching the object feature in each of the original map data;

considering an object with the matched object feature as a reference object and performing fusion processing on each of the original map data.

Furthermore, the recognizing an object in the original map data respectively and extracting an object feature may comprise:

performing recognition on a static object using point cloud data in the original map data and extracting a structural feature of the static object.

Furthermore, the performing recognition on a static object using point cloud data in the original map data and extracting a structural feature of the static object may comprise:

recognizing a lane line based on a reflectivity of the point cloud data in the original map data, fitting a road plane by means of the lane line, and extracting a planar feature of the road plane.

Furthermore, the performing recognition on a static object using point cloud data in the original map data and extracting a structural feature of the static object may further comprise:

performing minimum bounding box recognition on an object beyond a road plane based on the point cloud data, recognizing respectively a vehicle and a lamp post according to a feature of the minimum bounding box, extracting a planar feature of a vehicle top of the motionless vehicle, and extracting a gravity centre feature of the lamp post.

Furthermore, the performing recognition on a static object using point cloud data in the original map data and extracting a structural feature of the static object may comprise:

clustering point cloud data having reflectivity reaching a high reflectivity condition based on the reflectivity of the point cloud data in the original map data, performing plane fitting on the clustered point cloud data, recognizing a road sign from the fitted plane and extracting a planar feature of the road sign.

Furthermore, before recognizing respectively an object in the original map data and extracting an object feature, the method may further comprise:

respectively analyzing and partitioning the original map data according to a collection track; and associating partitioned original map data segments to serve as associated original map data for subsequently recognizing the object.

Furthermore, the considering an object with the matched object feature as a reference object and performing fusion processing on each of the original map data may comprise:

considering the object with the matched object feature as the reference object and calculating an offset rotation angle and an offset for each of the original map data; and performing fusion processing on the original map data based on the offset rotation angle and the offset of each of the original map data.

Through the above description of the embodiments, it should be apparent to those skilled in the art that the present disclosure may be implemented by means of software and requisite general hardware, or naturally may be implemented by hardware, but in many cases the former is a better embodiment. Based on such understanding, the technical solution of the present disclosure essentially, or the part that contributes over the existing technology may be embodied in the form of a software product. The computer software product may be stored in a computer readable storage medium such as a flexible disk, a read-only memory (ROM) or a random access memory (RAM), FLASH, a hard disk or an optical disk comprising a plurality of instructions for causing a computer device (which may be a personal computer, a server, or a network device, etc.) to execute the methods described in the embodiments of the present disclosure.

It should be noted that in the embodiments of the device for processing high-precision map data described above, the respective units and modules are divided according to the functional logics, but not limited to the above-described division, as long as the corresponding function may be achieved. In addition, the specific name of each of functional units is merely for ease of mutual distinction and is not intended to limit the scope of the present disclosure.

The above descriptions are merely specific implementations of the present disclosure, but the protection scope of the present disclosure is not limited thereto. Any variations or replacements that can be easily conceived of by those skilled in the art within the technical scope disclosed by the present disclosure shall be encompassed by the protection scope of the present disclosure. Therefore, the protection scope of the present disclosure shall be subject to the protection scope of the claims.

What is claimed is:

1. A method for processing high-precision map data, comprising:

performing at least twice collection on map data along a target trajectory so as to respectively acquire at least twice original map data;

recognizing an object in the original map data respectively and extracting an object feature;

matching the object feature in each of the original map data;

considering an object with the matched object feature as a reference object and performing fusion processing on each of the original map data, wherein before recognizing an object in the original map data respectively and extracting an object feature, the method further comprises:

respectively analyzing and partitioning the original map data according to a collection track; and associating partitioned original map data segments to serve as associated original map data for subsequently recognizing the object.

2. The method according to claim 1, wherein the recognizing an object in the original map data respectively and extracting an object feature comprises:

performing recognition on a static object using point cloud data in the original map data and extracting a structural feature of the static object.

3. The method according to claim 2, wherein the performing recognition on a static object using point cloud data in the original map data and extracting a structural feature of the static object comprises:

recognizing a lane line based on a reflectivity of the point cloud data in the original map data, fitting a road plane by means of the lane line, and extracting a planar feature of the road plane.

4. The method according to claim 2, wherein the performing recognition on a static object using point cloud data in the original map data and extracting a structural feature of the static object comprises:

performing minimum bounding box recognition on an object beyond a road plane based on the point cloud data, recognizing respectively a vehicle and a lamp post according to a feature of the minimum bounding box, extracting a planar feature of a vehicle top of the motionless vehicle, and extracting a gravity centre feature of the lamp post.

5. The method according to claim 2, wherein the performing recognition on a static object using point cloud data in the original map data and extracting a structural feature of the static object comprises:

clustering point cloud data having reflectivity reaching a high reflectivity condition based on the reflectivity of the point cloud data in the original map data, performing plane fitting on the clustered point cloud data, recognizing a road sign from the fitted plane and extracting a planar feature of the road sign.

6. The method according to claim 1, wherein the considering an object with the matched object feature as a reference object and performing fusion processing on each of the original map data comprises:

considering the object with the matched object feature as the reference object and calculating an offset rotation angle and an offset for each of the original map data; and performing fusion processing on the original map data based on the offset rotation angle and the offset of each of the original map data.

7. The method according to claim 2, wherein the considering an object with the matched object feature as a reference object and performing fusion processing on each of the original map data comprises:

considering the object with the matched object feature as the reference object and calculating an offset rotation angle and an offset for each of the original map data; and performing fusion processing on the original map data based on the offset rotation angle and the offset of each of the original map data.

8. An apparatus for processing high-precision map data, comprising:
- at least one processor; and
- a memory storing instructions, which when executed by the at least one processor, cause the at least one processor to perform operations, the operations comprising:
- performing at least twice collection on map data along a target trajectory so as to respectively acquire at least twice original map data;
- recognizing an object in the original map data respectively and extracting an object feature;
- matching the object feature in each of the original map data; and
- considering an object with the matched object feature as a reference object and performing fusion processing on each of the original map data, wherein before recognizing an object in the original map data respectively and extracting an object feature, the operations further comprise:
- respectively analyzing and partitioning the original map data according to a collection track; and
- associating partitioned original map data segments to serve as associated original map data for subsequently recognizing the object.

9. The apparatus according to claim 8, wherein the recognizing an object in the original map data respectively and extracting an object feature comprises:
- performing recognition on a static object using point cloud data in the original map data and extracting a structural feature of the static object.

10. The apparatus according to claim 9, wherein the performing recognition on a static object using point cloud data in the original map data and extracting a structural feature of the static object comprises:
- recognizing a lane line based on a reflectivity of the point cloud data in the original map data, fitting a road plane by means of the lane line, and extracting a planar feature of the road plane.

11. The apparatus according to claim 9, wherein the performing recognition on a static object using point cloud data in the original map data and extracting a structural feature of the static object comprises:
- performing minimum bounding box recognition on an object beyond a road plane based on the point cloud data, recognizing respectively a vehicle and a lamp post according to a feature of the minimum bounding box, extracting a planar feature of a vehicle top of the motionless vehicle, and extracting a gravity centre feature of the lamp post.

12. The apparatus according to claim 9, wherein the performing recognition on a static object using point cloud data in the original map data and extracting a structural feature of the static object comprises:
- clustering point cloud data having reflectivity reaching a high reflectivity condition based on the reflectivity of the point cloud data in the original map data, performing plane fitting on the clustered point cloud data, recognizing a road sign from the fitted plane and extracting a planar feature of the road sign.

13. The apparatus according to claim 8, wherein the considering an object with the matched object feature as a reference object and performing fusion processing on each of the original map data comprises:
- considering the object with the matched object feature as the reference object and calculating an offset rotation angle and an offset for each of the original map data; and
- performing fusion processing on the original map data based on the offset rotation angle and the offset of each of the original map data.

14. A non-transitory computer storage medium, the computer storage medium storing one or more modules, wherein when the one or more modules are performed by a device for executing a method for processing high-precision map data, the device is caused to:
- perform at least twice collection on map data along a target trajectory so as to respectively acquire at least twice original map data;
- recognize an object in the original map data respectively and extract an object feature;
- match the object feature in each of the original map data; and
- consider an object with the matched object feature as a reference object and perform fusion processing on each of the original map data, wherein before recognizing an object in the original map data respectively and extracting an object feature, the device is further caused to:
- respectively analyze and partition the original map data according to a collection track; and
- associate partitioned original map data segments to serve as associated original map data for subsequently recognizing the object.

* * * * *

UNITED STATES PATENT AND TRADEMARK OFFICE
CERTIFICATE OF CORRECTION

PATENT NO. : 10,628,712 B2
APPLICATION NO. : 15/758623
DATED : April 21, 2020
INVENTOR(S) : Jiang et al.

Page 1 of 1

It is certified that error appears in the above-identified patent and that said Letters Patent is hereby corrected as shown below:

On the Title Page

At Item (73) (Assignee), please delete "Baidu Online Networking Technology (Beijing) Co., Ltd." and insert --Baidu Online Network Technology (Beijing) Co., Ltd.-- therefor.

Signed and Sealed this
Sixteenth Day of June, 2020

Andrei Iancu
*Director of the United States Patent and Trademark Office*